United States Patent [19]

Nishi et al.

[11] Patent Number: 5,283,415
[45] Date of Patent: Feb. 1, 1994

[54] MANUFACTURING METHOD OF A VEHICLE PANEL

[75] Inventors: Eiji Nishi; Kimikazu Ikemoto, both of Toyota; Fumiaki Natsumi, Okazaki; Takao Iwai, Toyota; Toshiyuki Takasago, Toyota; Toshiro Shiraki, Toyota, all of Japan

[73] Assignee: Toyota Jidosha Kabushiki Kaisha, Toyota, Japan

[21] Appl. No.: 950,168

[22] Filed: Sep. 24, 1992

[30] Foreign Application Priority Data

Sep. 25, 1991 [JP] Japan .................. 3-271798

[51] Int. Cl.$^5$ .............................................. B23K 26/00
[52] U.S. Cl. .................................................. 219/121.64
[58] Field of Search ................... 219/121.63, 121.64, 219/121.82, 121.79

[56] References Cited

U.S. PATENT DOCUMENTS

| | | | |
|---|---|---|---|
| 4,577,088 | 3/1986 | Sharp | 219/121.64 |
| 4,654,505 | 3/1987 | Sciaky et al. | 219/121.63 |
| 4,759,489 | 7/1988 | Pigott | 219/121.63 X |
| 4,967,053 | 10/1990 | Aharon | 219/121.78 |

FOREIGN PATENT DOCUMENTS

| | | |
|---|---|---|
| 0117751 | 2/1984 | European Pat. Off. . |
| 63-32554 | 6/1988 | Japan . |
| 63-55397 | 11/1988 | Japan . |
| 3-24371 | 3/1991 | Japan . |
| 3-36365 | 4/1991 | Japan . |
| 2210309 | 6/1989 | United Kingdom . |

OTHER PUBLICATIONS

Patent Abstracts of Japan, vol. 9, No. 244 (E-346) 30 Sep. 1985 & JP-A-60 094 712 (Toshiba K.K.) 27 May 1985.

Primary Examiner—C. L. Albritton
Attorney, Agent, or Firm—Cushman, Darby & Cushman

[57] ABSTRACT

Sheared steel sheet materials are abutted against each other with burrs of the steel sheet materials directed in the same direction. A laser beam is irradiated onto the abutment portion of the assembly of the steel sheets from the sagging side of the assembly. At the same time, a filler wire is supplied to the abutment portion from the same side as the laser beam irradiation. The steel sheet materials are joined together to form a press material. Then, the press material is set in a press machine in a direction that a surface of the press material opposite to the laser beam irradiated surface, faces the exterior when stamped and mounted to a vehicle. Then, the press material is stamped and is formed into a vehicle panel.

10 Claims, 10 Drawing Sheets

MANUFACTURING METHOD OF A VEHICLE PANEL

BACKGROUND OF THE INVENTION

1. Field of the Invention

The present invention relates to a method for manufacturing a vehicle panel by laser-welding steel sheets together.

2. Description of the Prior Art

Recently, a plurality of steel sheet materials are laser-welded into a one-piece assembly and used as press material for vehicle panels. This is because one-piece stamping decreases cost as compared with a case where independent sheets are stamped and then welded together. Also, the laser welding over an entire length of the abutment line of the abutted steel sheets can increase strength as compared with a case where sheets are joined by spot welding.

However, these laser-welded assemblies of steel sheets usually have saggings, which result from the shearing of the sheet materials, and dents, which are generated at the ends of the weld line. Thus, these welded assemblies are inferior to integral sheets in view quality, and application opportunities in a vehicle to which the welded assemblies are used have been limited to inner panels of the vehicle which are not seen from the outside.

SUMMARY OF THE INVENTION

An object of the invention is to provide a method for manufacturing a vehicle panel having a high appearance quality, whereby the panel manufactured according to the method can be used as an outer panel of a vehicle.

This object is achieved by a manufacturing method in accordance with the invention, wherein sheared steel sheets are abutted, with the burrs of the steel sheets directed in the same direction. Then, the steel sheets are laser-welded by irradiating the laser beam and supplying a filler to the abutment portion from the sagging side of the assembly of the abutted steel sheets. Then, the welded assembly of the steel sheets is set in a press machine so that the surface of the assembly opposite to the laser beam irradiated surface faces outside when mounted to a vehicle, and then the assembly of the steel sheets is stamped to a panel of the vehicle.

The resultant vehicle panel contains no concave portions that usually result from saggings in the outer surface thereof. The surface of the weld bead may be ground to a flat surface, if necessary. Yet, since the outer surface of the assembly has no concave portions, the assembly need not be excessively ground and thus the strength of the assembly is not weakened by the grinding Since the resultant assembly possesses no concave portions in the outer surface, it is able to be used as an outer panel of a vehicle.

BRIEF DESCRIPTION OF THE DRAWINGS

The above and other objects, features, and advantages of the present invention will become more apparent and will be more readily appreciated from the following detailed description of the preferred embodiment of the invention taken in conjunction with the accompanying drawings, in which.

DETAILED DESCRIPTION OF THE PREFERRED EMBODIMENTS

Figure 3:
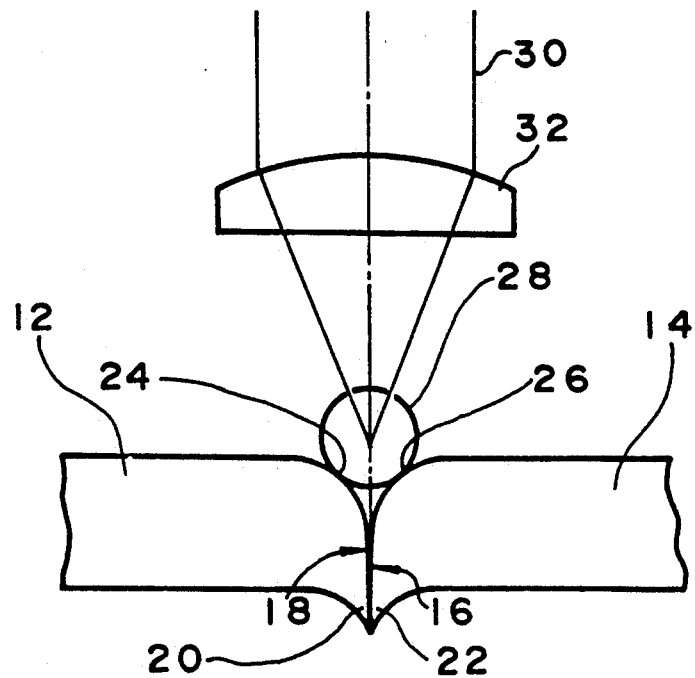
FIG. 3 is a elevational view of the assembly of abutted st materials and the filler of FIG. 2 viewed in a direction of arrow A of FIG. 2.
Figure 4:
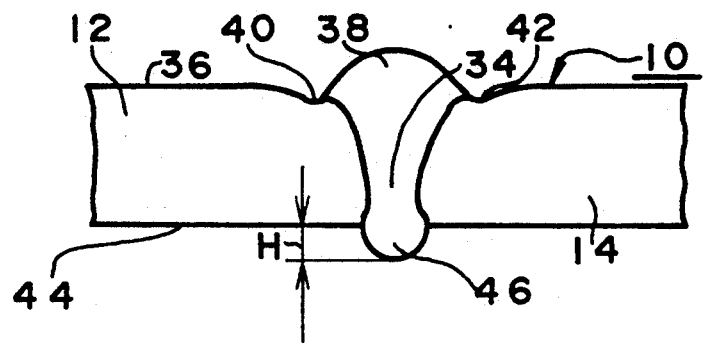
FIG. 4 is a front elevational view of a welded bead and a of an assembly of welded steel sheet materials manufactured in accordance with the method of the invention.
Figure 5:
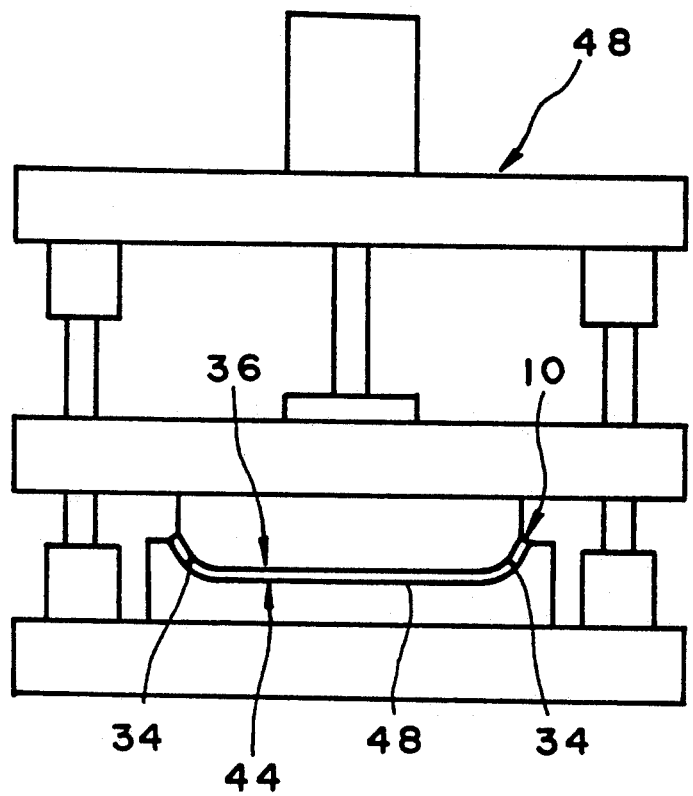
FIG. 5 is a front elevational view of a press apparatus and the welded assembly of the steel sheet materials during the step of stamping in accordance with the materials during the invention.

FIGS. 1-4 illustrate processes for manufacturing a press material of one-piece welded assembly from a plurality of sheared steel sheet materials, and FIG. 5 illustrates a process for stamping the press material to a vehicle panel.

Steel sheets are shear-cut by a press machine to steel sheet materials 12 and 14 of predetermined specific dimensions. Preferably, sheets 12 and 14 have the same thickness, although this is not essential. Due to the shearing, the steel sheet materials 12 and 14 have burrs 20 and 22, respectively, at one edge of the end surfaces 16 and 18, respectively, and saggings 24 and 26, respectively, at opposite edges of the end surfaces 16 and 18, respectively. Steel sheet materials of 0.8-1.2 mm thicknesses are used for outer panels of vehicles, and the sizes of burrs and saggings produced in the steel sheets of those orders of thicknesses generated during shearing are of about 0.1 mm in height (in a thickness direction) and can be acknowledged when viewed.

Figure 1:
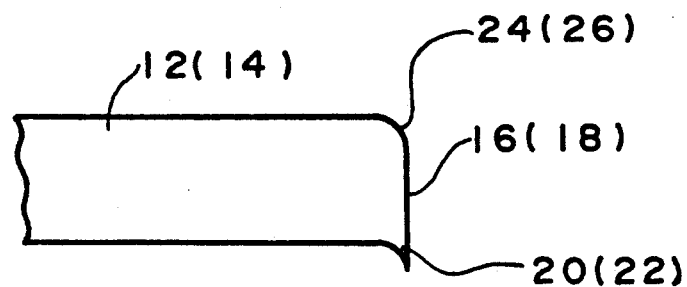
FIG. 1 is a front elevational view of an end portion of a sheared steel sheet material used in a manufacturing method of a vehicle panel in accordance with the invention.
Figure 2:
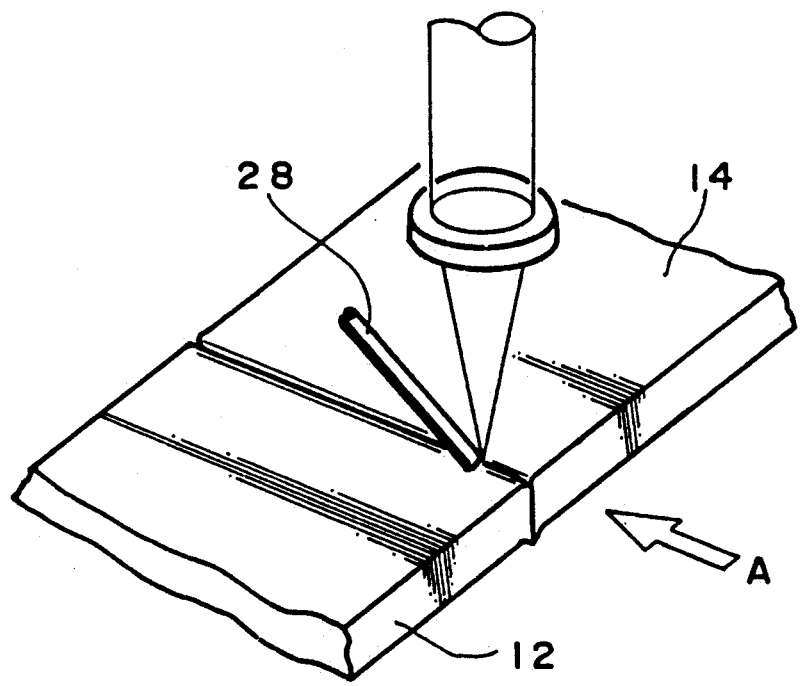
FIG. 2 is a partial oblique view of an assembly of abutted steel sheet materials during a step of laser-welding supplied with a filler in the method of the invention.

As illustrated in FIGS. 2 and 3, a plurality of steel sheet materials 12 and 14 are abutted each other and are laser-welded into a one-piece press material. The steel sheet material 12 and 14 are abutted at the abutment surfaces 16 and 18, i.e. end surfaces, with the burrs 20 and 22 of the steel sheet materials 12 and 14 directed in the same direction. In FIG. 3, the burrs 20 and 22 are directed downwardly. As a result, the saggings 24 and 26 of the steel sheet materials 12 and 14 also directed in the same direction.

A filler 28 in the form of a wire is supplied to the abutment portion or abutment line, which is defined by the abutment surfaces 16 and 18, of the abutted assembly of steel sheet materials 12 and 14, from the side of the saggings 24 and 26 of the abutted assembly of steel sheet materials 12 and 14. When a small gap exists between the abutment surfaces 16 and 18, filler metal is usually supplied to the abutment portion to compensate the gap. The filler 28 used in the invention is supplied in the form of a wire having, as an example, a 0.8 mm diameter. It is composed of substantially pure iron that includes up to 0.005% carbon. The axis of the supplied filler 28 is positioned in a plane perpendicular to the upper surface of the assembly of abutted steel sheet materials 12 and 14 such that its center lies between the abutment surfaces 16 and 18. Since the filler 28 is supplied to the side of the assembly possessing the saggings, the filler 28 can be positioned exactly above the center between the abutment surfaces 16 and 18, and be guided by the concave strip defined by the saggings 24 and 26 formed in the upper surface of the assembly of abutted steel sheet materials 12 and 14, without interfering with the burrs.

As illustrated in FIG. 3, a laser beam 30 is irradiated from the side of saggings 24 and 26 of the assembly of abutted steel sheet materials 12 and 14. The laser beam 30 is focused by a collimating lens 32 and the focused beam is irradiated onto the abutted portion of the steel sheet materials 12 and 14. The laser beam 30, the collimating lens 32, and the filler 28 are moved along the abutment portion so that the steel sheet materials 12 and 14 are laser-welded together over the entire length of the abutment portion. Since the laser beam 30 is irradiated from the same side as the filler supply, the filler 28 also is irradiated by the laser beam 30 and perfectly melted.

FIG. 4 shows a weld portion 34 of a press material 10 obtained by the above-described laser welding. As seen from FIG. 4, the weld portion 34 is raised above the plane of the laser beam irradiated surface 36 of the press material 10. The weld portion 34 has a weld bead 38 which includes a first portion composed of melted and solidified steel sheet material and a second portion composed of melted and solidified fill metal which covers the first portion. On both sides of the weld bead 38, in the upper surface of the press material 10 there are concaves 40 and 42 defined by the remaining saggings 24 and 26. In a surface 44 opposite to the laser irradiated-side surface 36, there is a protruding weld bead 46 which includes melted and solidified burr metal.

The concaves 40 and 42 will remain even if the upper surface of the press material 10 is ground after welding. A surface with such a concave is usually not suitable as an exterior of a vehicle panes. In contrast, the opposite surface 44, which contains the protruding weld bead 46, can be used for an external surface of a vehicle panel as the degree of protrusion of the weld bead is small. If necessary, the protruding weld bead 46 may be ground so that the surface is assuredly flat.

It is preferable to satisfy the following welding conditions during the laser-welding of the steel sheets 12 and 14.

The height H of the protruding weld bead 46 from the surface 44 of the steel sheets 12 and 14 should be equal to or less than 0.2 mm in the case where the thickness of the steel sheets 12 and 14 is in the range of 0.8 mm-1.2 mm. The height H of the weld bead is affected by the size of the gap between the abutment surfaces and the amount of filler metal supplied. In this regard, the gap between the abutment surfaces is usually in the range of 0 mm-0.2 mm. When the gap is in this range, the amount of fill metal supplied should be in the range of 0-0.2 mm$^3$/mm. These conditions are necessary to obtain a good extensibility (bending characteristic) of the weld bead. Good extensibility is necessary to prevent the press material from cracking when molded during the stamping process.

Figure 19:
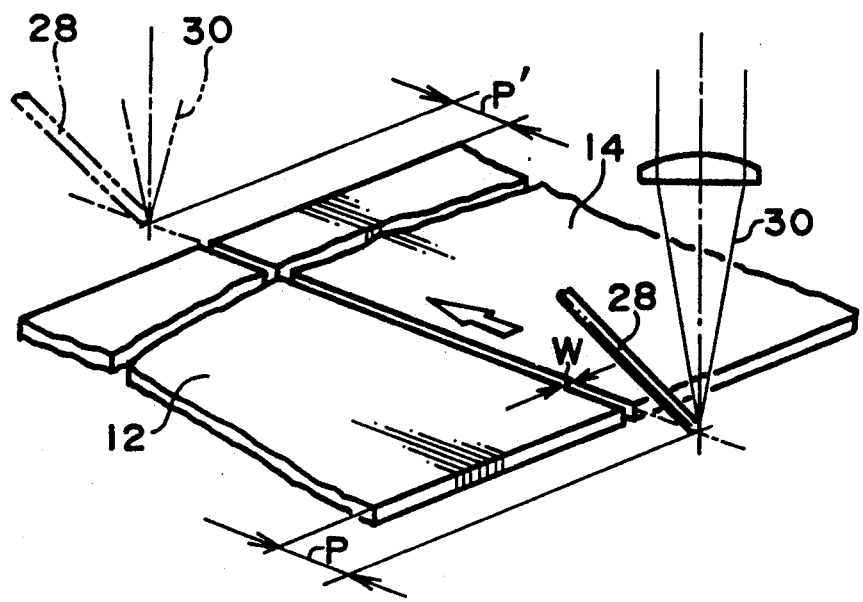
FIG. 19 is an oblique view of an assembly of abutted steel sheet materials illustrating a positional relationship between laser beam irradiation start and stop points and ends the assembly of the abutted steel sheets.
Figure 23:
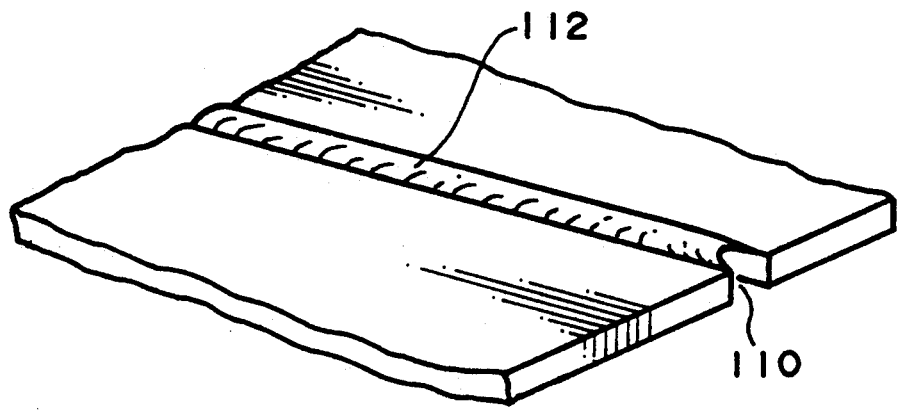
FIG. 23 is a partial oblique view of steel sheets welded together by a conventional laser welding method where shrinkage occurs in the weld bead.

As illustrated in FIG. 19, when the steel sheets 12 and 14 are abut each other, a gap W between the abutment surfaces 16 and 18 should be equal to or less than 0.1 mm for preventing a dent 110 (shrinkage of the weld bead in the longitudinal direction of the weld, see FIG. 23) which may be generated at ends of the weld line. Furthermore, to prevent generation of such a dent 110 or a lump of melted and solidified metal 114 (see FIG. 24) at ends of the weld line, the laser beam irradiation beginning and stopping positions should be apart from the respective ends of the assembly of the abutted steel sheets by respective distances P and P' (see FIG. 19), which should be equal to or greater than 2 mm. Similarly, to prevent generation of such a dent or lump of metal, a divergence between starting time of irradiation by the laser beam and initiation of fill metal supply should be in the range of −0.1 sec to 0.1 sec. Symmetrically, the divergence between stopping time of irradiation by the laser beam and fill metal supply should be in the range of −0.1 sec to 0.1 sec.

As illustrated in FIG. 5, the thus constructed press material 10 is stamped by a press machine 48 and is formed into a vehicle panel having a respective configuration. The press direction of the press material 10 is determined so that a surface 44 of the press material 10 opposite to the laser beam irradiated surface 36 corresponds to an outer surface (a surface visible from outside) of the panel when mounted to a vehicle. This surface 44 has no concave portions and has a high grade of appearance. In a case where the protruding bead 46 is ground, the surface 44 cannot be distinguished from a surface of an integral steel sheet without a weld joint. As a result, the press material of the invention can be used even for an outer panel of a vehicle.

The reasons why the above-described laser welding conditions should be taken will now be explained.

Figure 6:
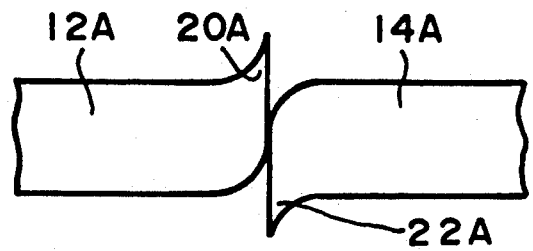
FIG. 6 is a front elevational view of steel sheet materials in a hypothetical case where the sheet materials are abutted each other with burrs directed in opposite directions to each other.
Figure 7:
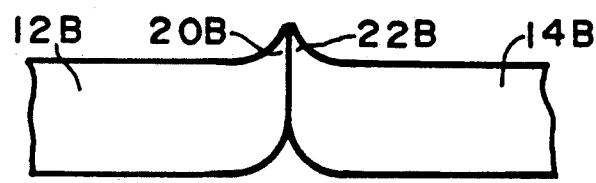
FIG. 7 is a front elevational view of steel sheet materials in another hypothetical case where the sheet materials are abutted each other with burrs directed in the same upward direction.
Figure 8:
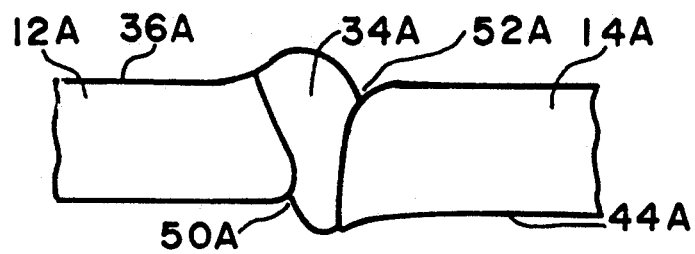
FIG. 8 is a front elevational view of the steel sheet materials of FIG. 6 after the sheet materials have been laser-welded.
Figure 9:
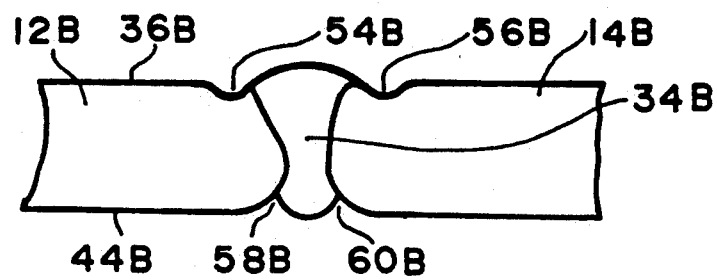
FIG. 9 is a front elevational view of the steel sheet materials of FIG. 7 after the sheet materials have been laser-welded.

With respect to the reason why the burrs 20 and 22 should be directed in the same direction and downwardly, if burrs 20A and 22A of steel sheet materials 12A and 14A were directed in opposite directions as shown in FIG. 6 and were laser-welded, as illustrated in FIG. 8, concaves 50A and 52A and steps would be generated adjacent the weld bead 34A in both upper and lower surfaces 36A and 44A of the sheets. Further, as shown in FIG. 7, if burrs 20B and 22B of steel sheet materials 12B and 14B were directed upwardly and a laser beam was irradiated from the burr side, concaves 54B, 56B, 58B, 60B would be produced in the upper and lower surfaces 36B and 44B on opposite sides of the weld portion 34B as shown in FIG. 9, and would degrade the appearance of the outer panel of a vehicle. If such concaves were removed by excess-grinding, the panel strength would decrease.

Figure 10:
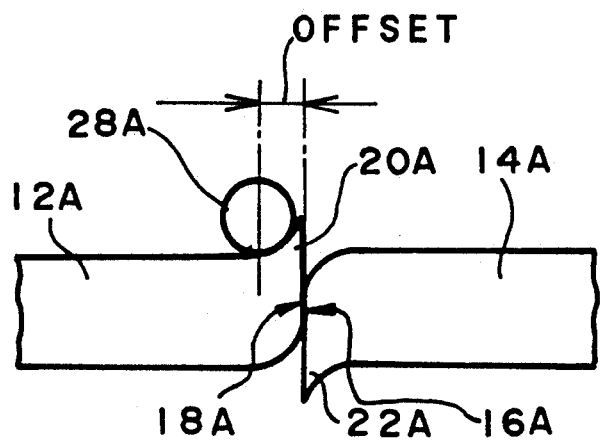
FIG. 10 is a front elevational view of the abutted steel sheet materials of FIG. 6 and a filler supplied to the steel sheet materials.
Figure 11:
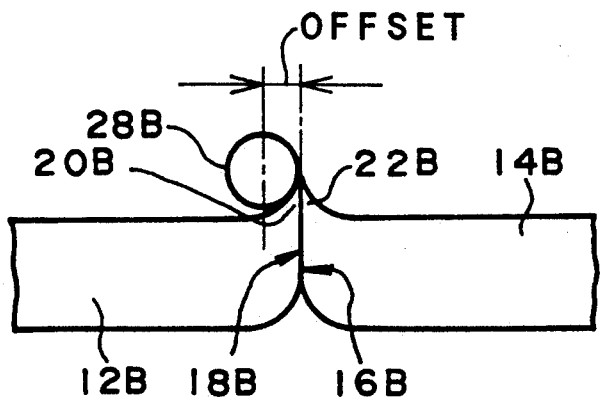
FIG. 11 is a front elevational view of the abutted steel sheet materials of FIG. 7 and a filler supplied to the steel sheet materials.
Figure 12:
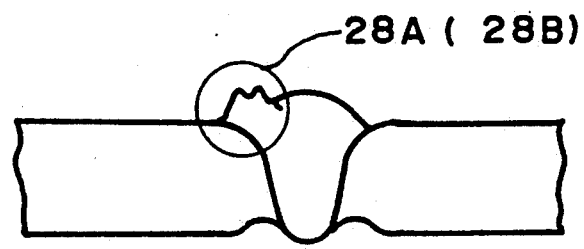
FIG. 12 is a front elevational view of a welded bead and the vicinity thereof the assemblies of steel sheet materials of FIGS. 10 and 11 after the steel sheet materials have been laser-welded.

With respect to the reason why the filler 28 should be supplied from the sagging side of the assembly of abutted steel sheets, if fillers 28A and 28B were supplied to the burr side in FIGS. 10 and 11, the fillers 28A and 28B would interfere with the burrs 20A, 20B, and 22B and could not be positioned exactly above the abutment surfaces 16A, 18A, 16B, and 18B. As a result, the weld bead would deviate from the abutment surface toward one side, and in addition, a partially non-melted portion of the fillers 28A and 28B would remain to result in a weld defect. However, in the present invention, the filler 28 is guided by the concave defined by the saggings 24 and 26 and is positioned exactly above the abutment surface. As a result, the filler 28 also is irradiated by the laser beam, so that the filler 28 is perfectly melted, leaving no weld defects produced by any non-melted portion of filler.

Figure 13:
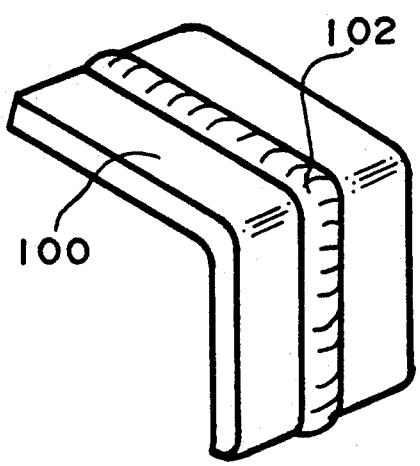
FIG. 13 is an oblique view of a test piece for bending of a welded assembly of the steel sheet materials which has been bent.
Figure 14:
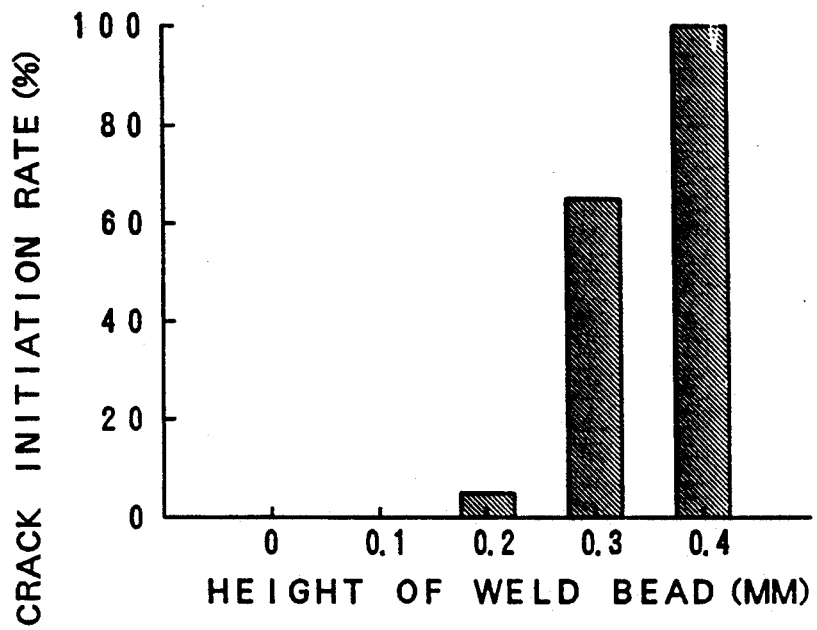
FIG. 14 is a graphical representation of a relationship between a crack generation rate and a weld bead height.

With respect to the reason why the height of the protruding weld bead from the surface of the assembly should be equal to or less than 0.2 mm, a relationship between a crack initiation rate in bending and a height of protruding weld bead was investigated using steel sheets of 1.0 mm thickness. In these tests, as illustrated in FIG. 13, the test piece 100 having a weld line 102 was bent by 90 degrees in a direction perpendicular to the weld line 102 and it was observed whether or not a crack was initiated at the bent portion of the weld bead. The test results are shown in FIG. 14. As seen from FIG. 14, when the height of the protruding weld bead from the surface of the welded assembly was equal to or less than 0.2 mm, the crack initiation rate was very small.

Figure 15:
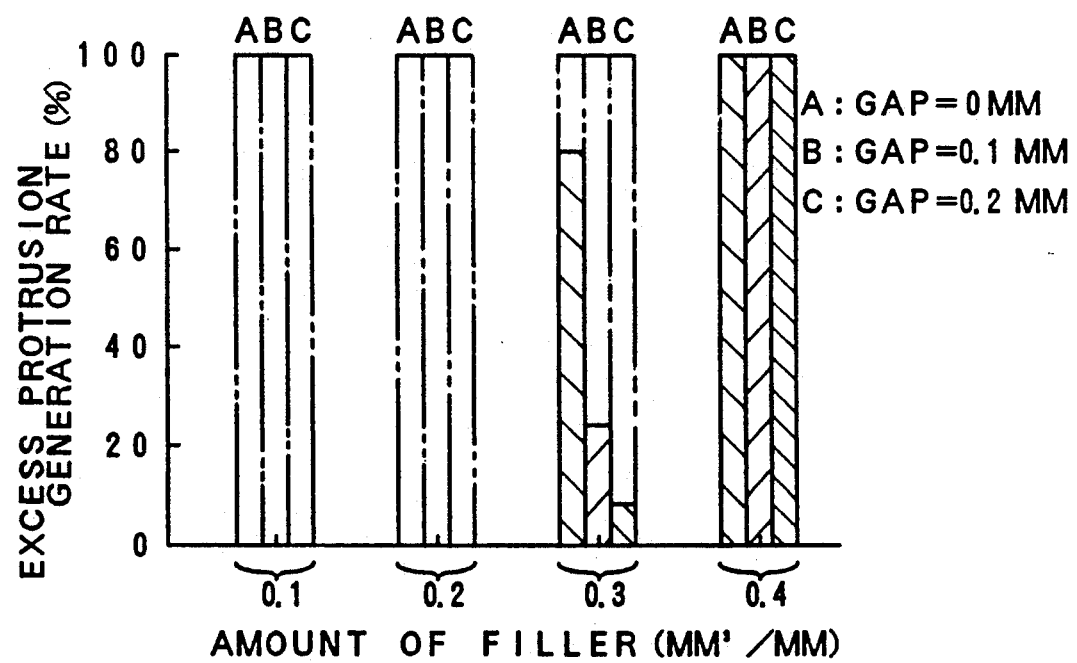
FIG. 15 is a graphical representation of a relationship between a generation rate of weld beads with an excessive height an amount of supply of filler metal.

With respect to the reason why the amount of fill metal supplied should be equal to or less than 0.2 $mm^3/mm$, a relationship between the amount of fill metal supplied and a height of the protruding weld bead from the surface of the welded assembly was investigated in tests using steel sheets of 1.0 mm thickness and varying a gap between the abutment surfaces. The test results are shown in FIG. 15. As seen from FIG. 15, the smaller the amount of supplied fill metal, the smaller the height of the protruding weld bead. Further, the smaller the gap between the abutment surfaces, the greater the height of the protruding weld bead. However, if the amount of filler metal supplied was set equal to or less than 0.2 $mm^3/mm$, the height of the protruding weld bead could be controlled to a height equal to or less than 0.2 mm.

Figure 16:
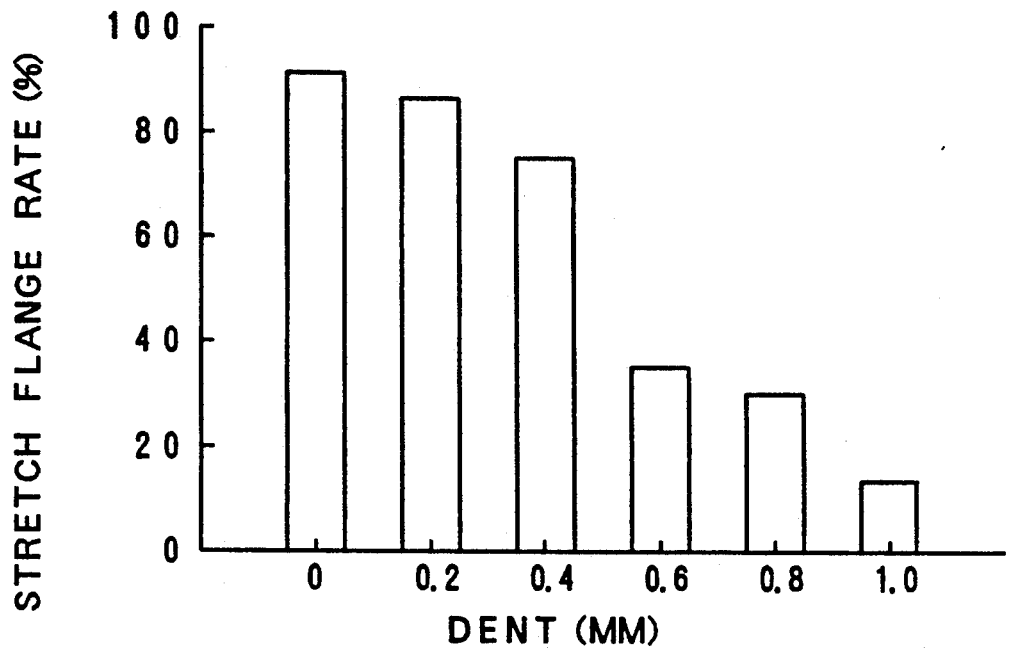
FIG. 16 is a graphical representation of a relationship between a stretch rate and a size of dent generated at ends of a weld line.
Figure 17:
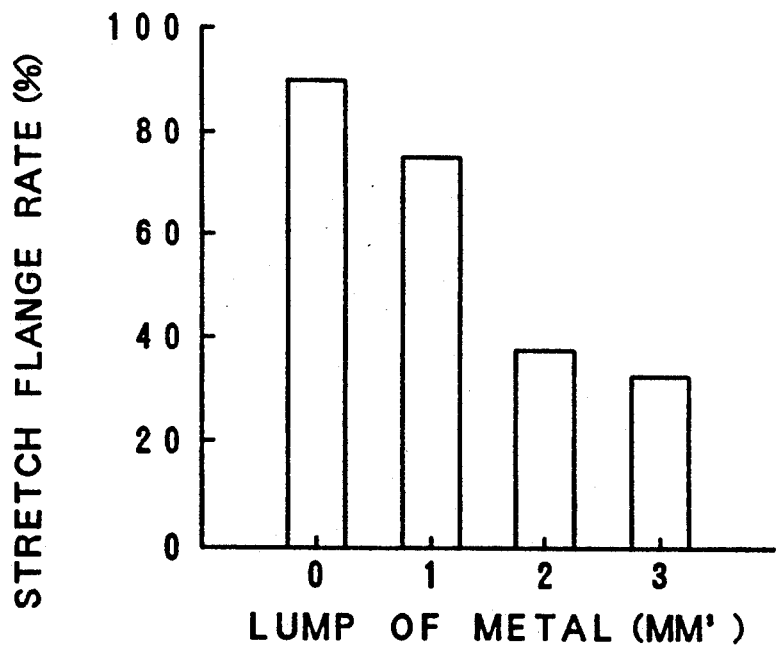
FIG. 17 is a graphical representation of a relationship between a stretch flange rate and a size of lump of metal generated at ends of a weld line.
Figure 18:
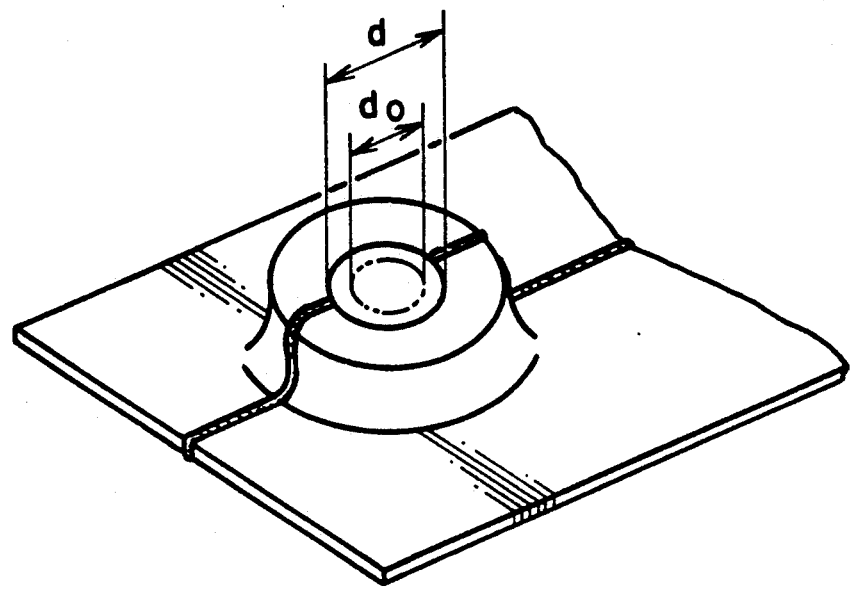
FIG. 18 is an oblique view of a test piece used in determining a stretch flange rate.
Figure 24:
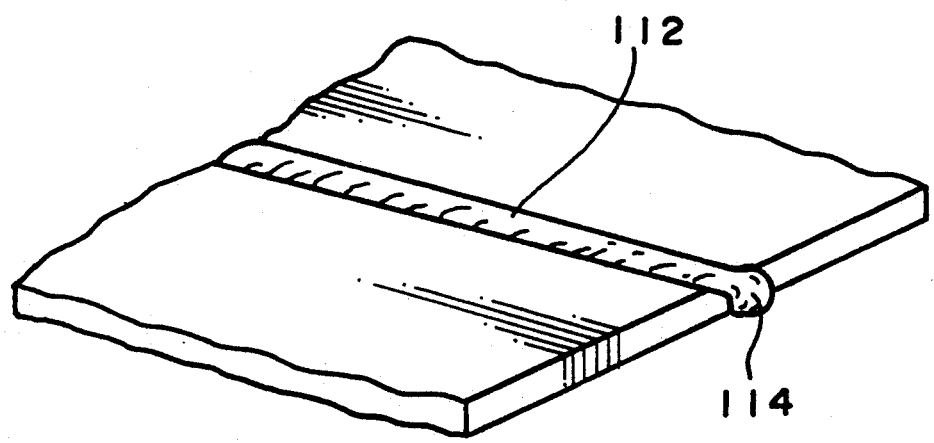
FIG. 24 is a partial oblique view of steel sheets welded together by a conventional laser welding method where lumps of metal are produced at the end of the weld line.

The reasons why a gap between the abutment surfaces should be equal to or less than 0.1 mm, why the distance P and P' in FIG. 19 should be equal to or greater than 2 mm, and why timing discrepancies between starting or stopping of laser beam irradiation and starting or stopping of filler supply should be within −0.1 to 0.1 sec are as follows:

In a conventional laser welding of steel sheets, a dent or shrinkage 110 of the weld bead tends to occur at ends of a weld line 112 as shown in FIG. 23, or a lump of metal 114 tends to be produced at ends of the weld line 112 as shown in FIG. 24. However, these dents and lumps of metal would degrade the stretch flange rate of the welded assembly, as illustrated in FIGS. 16 and 17 which are results of tests executed using steel sheets of 0.1 mm thickness. In this instance, the stretch flange rate D is defined as follows:

$$D = (d - d_0) / d_0 \times 100 \; (\%)$$

where, as shown in FIG. 18,
- $d_0$ is a diameter of an aperture perforated in the welded assembly so as to cross the weld bead before the welded assembly is stamped; and
- d is a diameter of the aperture after the welded assembly is press-formed to the configuration shown in FIG. 18.

More particularly, as seen from FIG. 16, when the dent or shrinkage was greater than 0.4 mm, the stretch flange rate decreased to a great extent, which is not acceptable. FIG. 16 means that the deut should be equal to or less than 0.4 mm. Further, as seen from FIG. 17, when the lump of metal was greater than 1 $mm^3$, the stretch flange rate decreased to a great extent, which is not acceptable. Thus, FIG. 17 means that the lump of metal should be equal to or less than 1 $mm^3$ in volume.

The welding conditions which could satisfy the above-described requirements were investigated.

Figure 20:
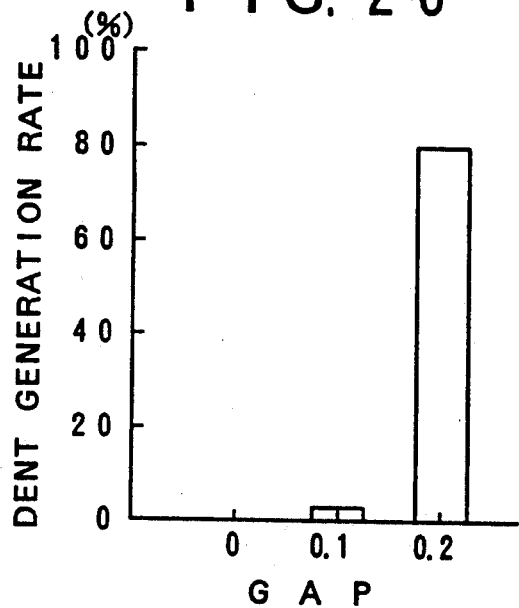
FIG. 20 is a graphical representation of a relationship between a dent generation rate and a gap between steel sheet abutment surfaces.

First, a relationship between the abutment gap and dent generation rate was investigated by test. The test results are shown in FIG. 20. As seen from FIG. 20, when the gap was equal to or smaller than 0.1 mm, the generation rate of a dent greater than 0.4 mm was very small which is acceptable. When the gap was 2 mm or greater, the dent generation rate was high, which is not acceptable. FIG. 20 means that the gap should be equal to or less than 0.1 mm from the viewpoint of preventing the generation of a dent or shrinkage at ends of the weld line.

Figure 21:
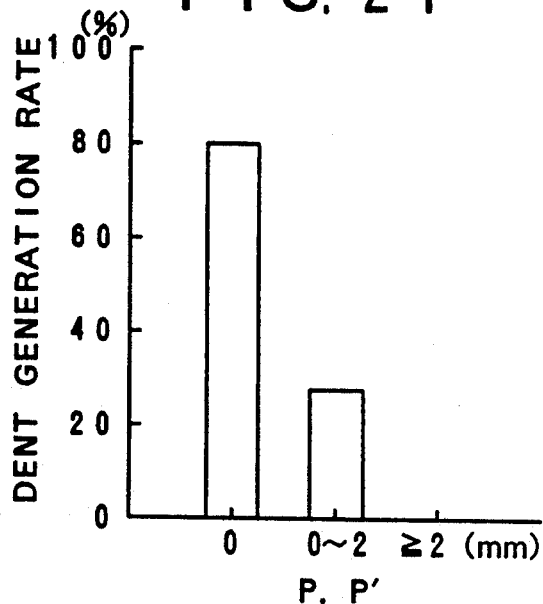
FIG. 21 is a graphical representation of a relationship between a dent generation rate and distances between laser beam irradiation start and stop points and ends of the assembly of the abutted steel sheets.

Also, a relationship between distances P and P' (FIG. 19) and a dent generation rate was investigated by test. The test results are shown in FIG. 21. As seen from FIG. 21, when the distances P and P' were equal to or more than 2 mm, no dent or shrinkage was found in the test pieces. However, when the distances were smaller than 2 mm, a dent was found. FIG. 21 means that the distances P and P' should be equal to or greater than 2 mm from the viewpoint of preventing generation of a dent.

Figure 22:
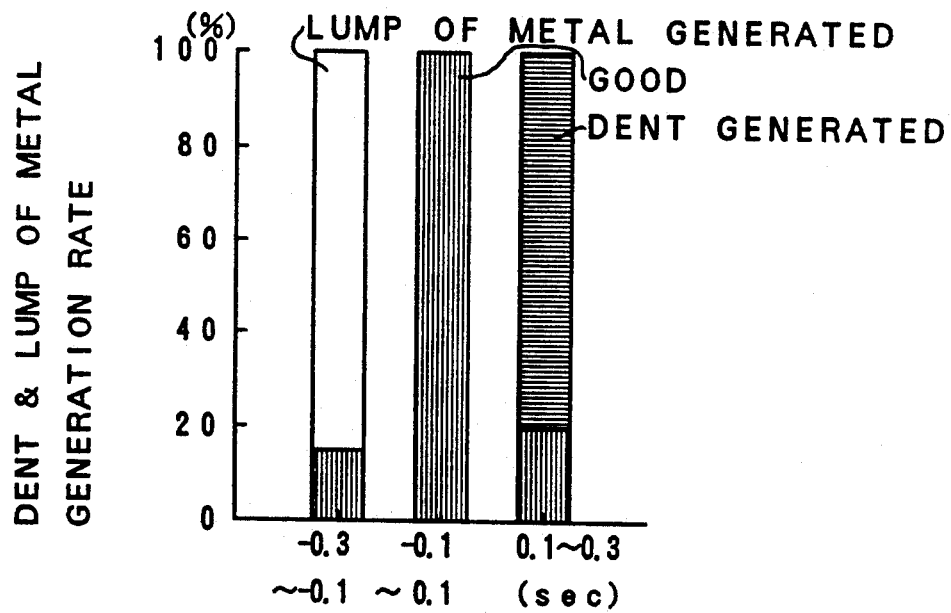
FIG. 22 is a graphical representation of a relationship between dent and lump of metal generation rates and timing differences between laser beam irradiation start and stop and filler wire supply start and stop.

Further, a relationship between offsetting of the laser beam irradiation start or stop time from the filler supply start or stop time and a dent or lump of metal generation rate was investigated by test. The test results are shown in the form of a histogram in FIG. 22. As seen from FIG. 22, when the start of fill wire supply was delayed more than 0.1 sec after the laser beam irradiation start, and when the laser beam irradiation was stopped more than 0.1 sec after the stop of fill wire supply, a dent was generated at the end of the weld line. Similarly, when the start of fill wire supply advanced more than 0.1 sec before the beginning of laser beam irradiation, and when the fill wire supply was stopped more than 0.1 sec after the stopping of laser beam irradiation, a lump of metal was generated at the ends of the weld line. When the timing differences between the starting of laser beam irradiation and fill wire supply and between the stopping of the laser beam irradiation and the fill wire supply stop were in the range of −0.1 sec to 0.1 sec, neither dents nor lumps of metal were generated. FIG. 22 means that those timing differences should be set in the range of −0.1 sec to 0.1 sec.

In accordance with the present invention, the following advantage is obtained:

Since the method of the invention includes the steps of abutting sheared steel sheets against each other with the burrs directed in the same direction, laser-welding the abutted steel sheets by supplying a filler from the sagging side and by irradiating a laser beam from the same side as the filler supply side, determining the stamping direction so that the burr side of the welded assembly of the steel sheets faces outside when mounted to a vehicle, and stamping the welded assembly, formation of concaves are prevented in the outer surface of the vehicle panel. As a result, the panel manufactured in accordance with the method of the invention can be used for an outer panel of a vehicle.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A manufacturing method of a vehicle panel comprising the following steps of:

preparing a plurality of sheared steel sheet materials, each steel sheet material having a burr at an edge of an end surface and a sagging at an opposite edge of an end surface;

holding the steel sheet materials so that the end surfaces of the steel sheet materials are abutted against each other with the burrs of the abutted steel sheet materials directed in the same direction;

irradiating a laser beam from a side of the saggings of the abutted steel sheet materials onto an abutment portion of the abutted steel sheet materials, moving the laser beam along the abutment portion and supplying a filler to the abutment portion, to form a weld bead which joins the abutted sheet materials together into a press material;

setting the press material in a stamping apparatus in a direction such that a surface of the press material opposite to a laser beam irradiation-side surface, corresponds to an outside surface when stamped and then mounted to a vehicle; and stamping the press material into a vehicle panel.

2. A method according to claim 1, wherein during the step of preparing sheared steel sheet materials, sheets of the same thickness are selected.

3. A method according to claim 1, wherein during the step of supplying a filler, the filler is supplied at a rate of 0–0.2 mm$^3$/mm.

4. A method according to claim 3, wherein during the step of supplying a filler, the amount of filler metal supplied is selected so that a height of a weld bead from a surface of the assembly of steel sheets is equal to or less than 0.2 mm.

5. A method according to claim 1, wherein during the step of holding the steel sheet materials, the steel sheet materials are abutted so that a gap between the abutted steel sheet materials is equal to or less than 0.1 mm.

6. A method according to claim 1, wherein during the step of irradiating a laser beam, the laser beam irradiation starts at a position apart more than 2 mm from an end of an assembly of the abutted steel sheets.

7. A method according to claim 1, wherein during the step of irradiating a laser beam, the laser beam irradiation stops at a position apart more than 2 mm from an end of an assembly of the abutted steel sheet materials.

8. A method according to claim 1, wherein during the step of irradiating a laser beam and supplying a filler, a divergence between a starting time of irradiation of the laser beam and a starting time of supply of filler is set within a range of −0.1 sec to 0.1 sec.

9. A method according to claim 1, wherein during the step of irradiating a laser beam and supplying a filler, a divergence between a stopping time of irradiation of the laser beam and a stopping time of supply of filler is set within a range of −0.1 sec to 0.1 sec.

10. A method according to claim 1, further comprising a step of grinding the weld bead from a side opposite to a laser beam irradiation side after the steel sheet materials have been laser-welded and before the press material is stamped.

* * * * *